(12) United States Patent
Oniwa (10) Patent No.: US 10,422,404 B2
(45) Date of Patent: Sep. 24, 2019

(54) LIQUID-SEALED ANTIVIBRATION DEVICE

(71) Applicant: TOYO TIRE & RUBBER CO., LTD., Itami-shi, Hyogo (JP)

(72) Inventor: Tatsuya Oniwa, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 0 days.

(21) Appl. No.: 15/695,135

(22) Filed: Sep. 5, 2017

(65) Prior Publication Data

US 2018/0135722 A1 May 17, 2018

(30) Foreign Application Priority Data

Nov. 15, 2016 (JP) ................................. 2016-222146

(51) Int. Cl.
*F16F 13/10* (2006.01)
*B60K 5/12* (2006.01)

(52) U.S. Cl.
CPC ............ *F16F 13/10* (2013.01); *B60K 5/1208* (2013.01); *F16F 13/101* (2013.01);
(Continued)

(58) Field of Classification Search
CPC ........ F16F 13/10; F16F 13/101; F16F 13/107; F16F 13/16; B60K 5/1208; B60G 2202/30; B60G 2204/41062
See application file for complete search history.

(56) References Cited

U.S. PATENT DOCUMENTS 4,702,346 A * 10/1987 Uno ........................ F16F 13/14
181/207
5,178,373 A * 1/1993 Takeguchi .............. F16F 13/14
267/140.12
(Continued)

FOREIGN PATENT DOCUMENTS

CN 202612470 U 12/2012
CN 103519741 A 1/2014
(Continued)

OTHER PUBLICATIONS

Office Action dated Apr. 18, 2019, issued in counterpart CN application No. 2017106846703, with English translation. (8 pages).
(Continued)

*Primary Examiner* — Bradley T King
*Assistant Examiner* — James K Hsiao
(74) *Attorney, Agent, or Firm* — Westerman, Hattori, Daniels & Adrian, LLP (57) ABSTRACT

A liquid-sealed antivibration device is equipped with a shaft member and a sleeve member, an antivibration base body constituted by a rubber-like elastic body which elastically supports the sleeve member relative to the shaft member and which defines a first liquid chamber and a second liquid chamber between the shaft member and the sleeve member, and an orifice forming member made of a synthetic resin and disposed inside the sleeve member. The orifice forming member is formed with end surfaces on which a hole portion piercing along the axis of the shaft member opens, and an outer peripheral surface adhered closely to the sleeve member to form a groove portion becoming an orifice which makes the first liquid chamber communicate with the second liquid chamber, and recesses formed at corner portions defined by the end surfaces and the outer peripheral surface are connected to the hole portion.

5 Claims, 11 Drawing Sheets

(52) U.S. Cl.
CPC ........ *F16F 13/107* (2013.01); *B60G 2202/30* (2013.01); *B60G 2204/41062* (2013.01); *F16F 2224/04* (2013.01); *F16F 2230/30* (2013.01)

(56) References Cited

U.S. PATENT DOCUMENTS

| | | | | |
|---|---|---|---|---|
| 5,228,662 | A * | 7/1993 | Kojima | F16F 13/30 267/140.12 |
| 5,690,320 | A * | 11/1997 | Kanda | F16F 13/16 267/140.12 |
| 5,813,665 | A * | 9/1998 | Kanda | F16F 13/1409 267/140.12 |
| 6,557,836 | B2 * | 5/2003 | Itoh | F16F 13/16 267/140.11 |
| 6,599,640 | B2 * | 7/2003 | Suzuki | F16F 1/3842 267/136 |
| 7,198,258 | B2 * | 4/2007 | Sato | F16F 13/1409 267/140.13 |
| 2002/0175456 | A1 | 11/2002 | Itoh | |
| 2010/0213651 | A1 * | 8/2010 | Hori | F16F 13/14 267/140.13 |
| 2013/0015614 | A1 * | 1/2013 | Bradshaw | F16F 13/16 267/140.13 |
| 2013/0069288 | A1 * | 3/2013 | Saito | F16F 13/16 267/140.13 |
| 2013/0292889 | A1 * | 11/2013 | Power | F16F 13/106 267/140.13 |
| 2014/0001685 | A1 * | 1/2014 | Kim | F16F 13/10 267/140.13 |
| 2016/0003322 | A1 * | 1/2016 | Bradshaw | F16F 13/16 267/140.13 |

FOREIGN PATENT DOCUMENTS

| | | |
|---|---|---|
| CN | 203570907 U | 4/2014 |
| EP | 0718524 A1 | 6/1996 |
| JP | 2015-224651 A | 12/2015 |

OTHER PUBLICATIONS

Chinese Search Report dated Apr. 8, 2019, issued in counterpart application No. 2017106846703, with English translation. (5 pages).

* cited by examiner

FIG. 11

LIQUID-SEALED ANTIVIBRATION DEVICE

TECHNICAL FIELD

The present invention relates to a liquid-sealed antivibration device and particularly to, a liquid-sealed antivibration device capable of simply and easily performing a manipulation at the time of sealing liquid.

BACKGROUND ART

Heretofore, as liquid-sealed antivibration devices for supporting a vibration generation body such as a wheel, an engine or the like on a body of a vehicle, there has been known a liquid-sealed antivibration device which damps vibration by the good use of a resonance phenomenon of liquid (Patent Literature 1). In the technology disclosed in Patent Literature 1, an antivibration base body defines two liquid chambers between a shaft member and a sleeve member, and an orifice forming member disposed inside the sleeve member forms an orifice enabling the two liquid chambers to communicate with each other. In this liquid-sealed antivibration device, the work for sealing liquid is carried out by immersing into liquid the antivibration base body with the orifice forming member assembled, putting the sleeve member on the outer side of the orifice forming member in the liquid and then, contracting the diameter of the sleeve member.

CITATION LIST

Patent Literature

[Patent Literature 1] JP-A No. 2015-224651

SUMMARY OF THE INVENTION

Technical Problem

However, in the aforementioned related art, there is required a manipulation such as waving and shaking the orifice forming member in the liquid so that the liquid is not sealed with babbles remaining on end surfaces in the axial direction of the orifice forming member, and the manipulation is troublesome.

The present invention has been made in order to address the aforementioned problem, and an object of the present invention is to provide a liquid-sealed antivibration device capable of simply and easily performing a manipulation at the time of sealing liquid.

Solution to Problem

In order to achieve the object, a liquid-sealed antivibration device of the present invention is equipped with a shaft member formed cylindrically, a sleeve member disposed with a space relative to the shaft member, an antivibration base body constituted by a rubber-like elastic body which elastically supports the sleeve member relative to the shaft member and which defines a first liquid chamber and a second liquid chamber between the shaft member and the sleeve member, and an orifice forming member made of a synthetic resin and disposed inside the sleeve member. The orifice forming member is formed with end surfaces on which a hole portion piercing along the axis of the shaft member opens, and an outer peripheral surface adhered closely to the sleeve member to form a groove portion becoming an orifice, the orifice making the first liquid chamber communicate with the second liquid chamber, and recesses formed at corner portions defined by the end surfaces and the outer peripheral surface are connected to the hole portion.

Advantageous Effects of Invention

According to the liquid-sealed antivibration device described in claim 1, the orifice forming member is adhered closely to the sleeve member and is formed at the outer peripheral surface with the groove portion which becomes the orifice enabling the first liquid chamber and the second liquid chamber to communicate with each other. The recesses formed at the corner portions which the end surfaces and the outer peripheral surface make are connected to the hole portion, and thus, when the antivibration base body with the orifice forming member assembled is immersed into liquid, the liquid advances from the recesses into the hole portion. Since the hole portion pierces along the axis of the shaft member and opens on the end surfaces, it becomes possible to make bubbles difficult to remain on the end surfaces in the axial direction of the orifice forming member. As a result, the manipulation for waving and shaking the orifice forming member in the liquid can be made to be little and hence, the manipulation at the time of sealing the liquid can be made to be simple and easy.

According to the liquid-sealed antivibration device described in claim 2, the hole portion is formed at plural places of the orifice forming member. Since the number of the recesses is fewer than the number of the hole portions, an area of the outer peripheral surface of the orifice forming member can be prevented from being made by the recesses to become smaller beyond necessity. Since the area on the outer peripheral surface of the orifice forming member that receives a load of the sleeve member adhered closely can be secured, it becomes possible in addition to the effect of claim 1 to make the orifice forming member that receives the load of the sleeve member, become difficult to be damaged.

According to the liquid-sealed antivibration device described in claim 3, the hole portion communicates with the end surfaces at large-diameter portions, and a small-diameter portion being smaller in cross section than the large-diameter portions is connected to insides in an axial direction of the large-diameter portions. Therefore, in addition to the effect of claim 1, the large-diameter portions being larger in cross section than the small-diameter portion enable the liquid to enter the hole portion easily, and the small-diameter portion being smaller in cross section than the large-diameter portions can secure the cross section of the orifice forming member, so that the strength can be secured.

According to the liquid-sealed antivibration device described in claim 4, the orifice forming member includes a stopper portion formed with the hole portion and the recesses and a first protrusion and a second protrusion respectively protruding from opposite sides in a circumferential direction of the stopper portion. Outer peripheral surfaces of the first protrusion and the second protrusion continue to an outer peripheral surface of the stopper portion, and the groove portion is formed on the stopper portion, the first protrusion and the second protrusion. The axial lengths of the stopper portion and the second protrusion are longer than the axial length of the first protrusion, and the recesses are formed at the stopper portion on the first protrusion side. Therefore, in addition to the effect of claim 1, it becomes possible to enable the width of the groove portion not to be influenced by the recesses.

According to the liquid-sealed antivibration device described in claim 5, the orifice forming member includes a stopper portion formed with the hole portion and the recesses and a first protrusion and a second protrusion respectively protruding from opposite sides in a circumferential direction of the stopper portion. Outer peripheral surfaces of the first protrusion and the second protrusion continue to an outer peripheral surface of the stopper portion, and the groove portion is formed on the stopper portion, the first protrusion and the second protrusion. The axial lengths of the stopper portion and the second protrusion are longer than the axial length of the first protrusion, and the large-diameter portions are formed at the stopper portion on the first protrusion side. Therefore, in addition to the effects of claim 3, it becomes possible to enable the width of the groove portion not to be influenced by the large-diameter portions.

DESCRIPTION OF EMBODIMENT

Figure 1:
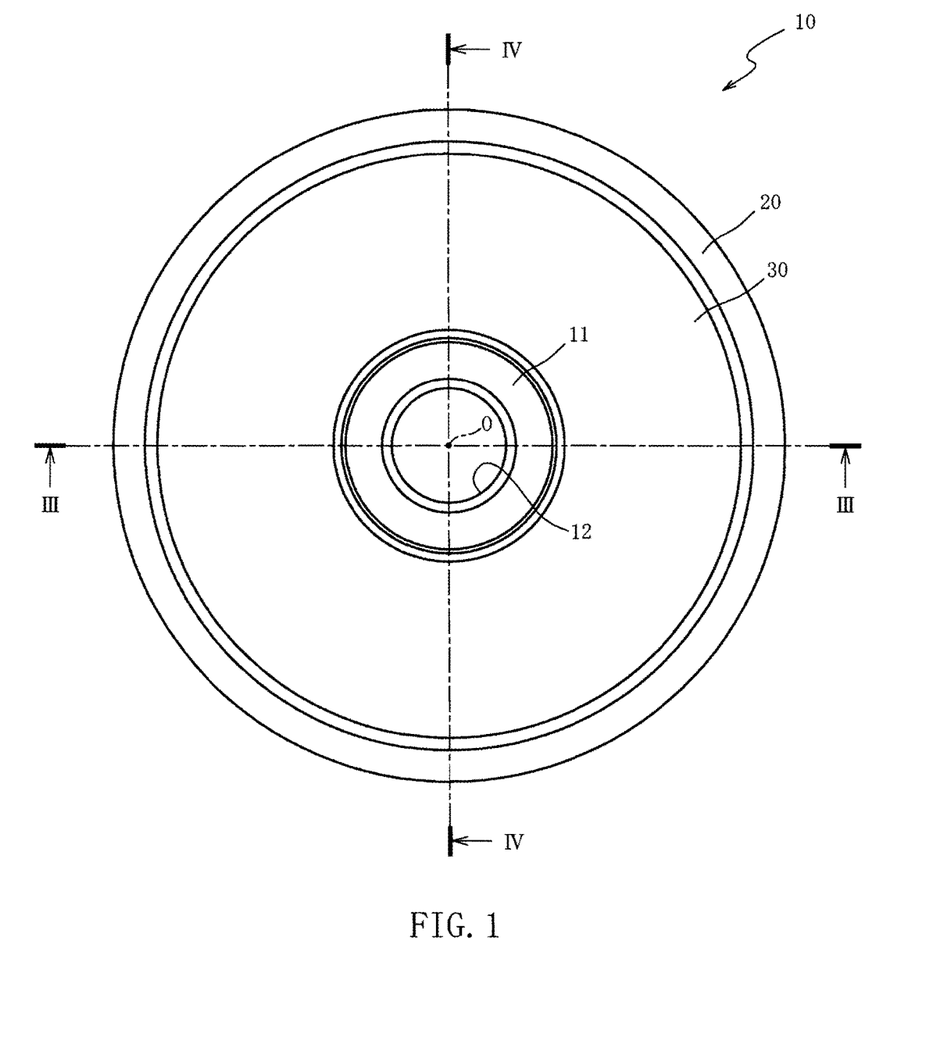
FIG. 1 is a plan view of a liquid-sealed antivibration device in one embodiment of the present invention.

Hereinafter, a preferred embodiment of the present invention will be described with reference to the accompanying drawings. FIG. 1 is a plan view of a liquid-sealed antivibration device 10 in one embodiment of the present invention, and FIG. 2 is a front view of the liquid-sealed antivibration device 10.

Figure 2:
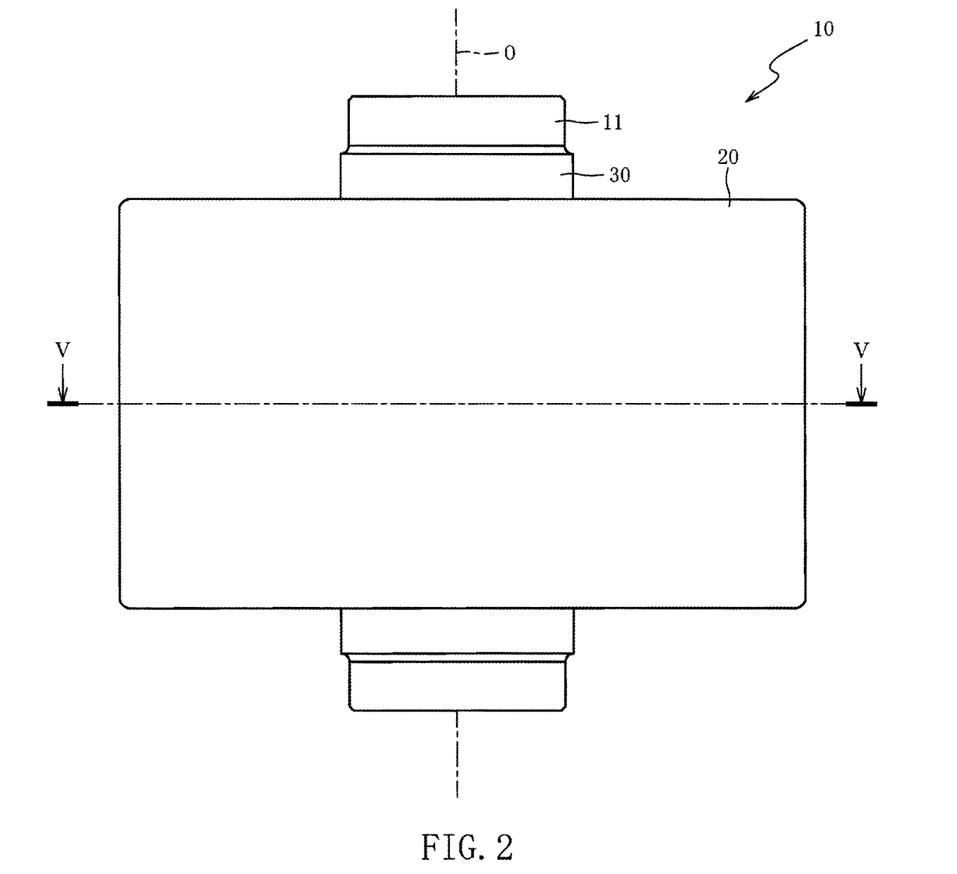
FIG. 2 is a front view of the liquid-sealed antivibration device.

As shown in FIG. 1 and FIG. 2, the liquid-sealed antivibration device 10 is equipped with a shaft member 11 formed cylindrically, a cylindrical sleeve member 20 disposed with a space relative to the shaft member 11, and an antivibration base body 30 interposed between the sleeve member 20 and the shaft member 11. The shaft member 11 is a member made of metal and formed with a through hole 12 along an axis O. A bolt (not shown) for fixing the shaft member 11 to a counterpart member (not shown) is inserted into the through hole 12. The sleeve member 20 is press-fitted into and secured to another counterpart member (not shown).

Figure 3:
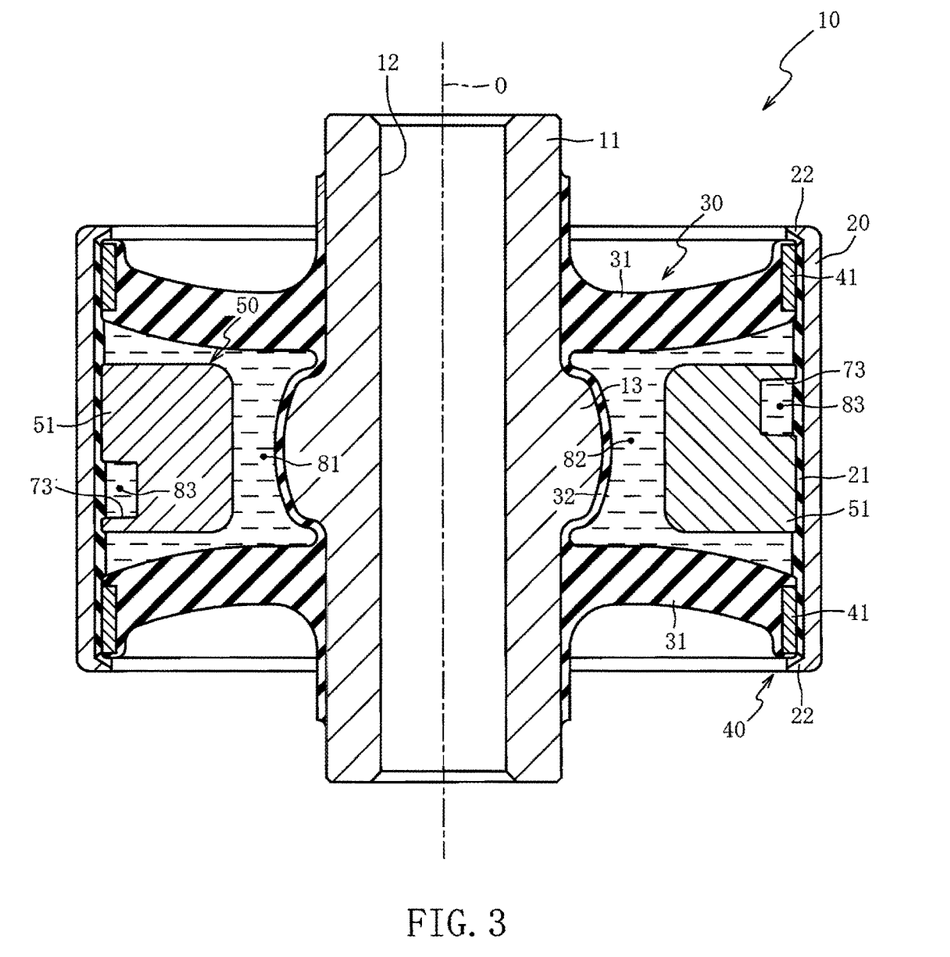
FIG. 3 is a sectional view of the liquid-sealed antivibration device taken along the III-III line in FIG. 1.
Figure 4:
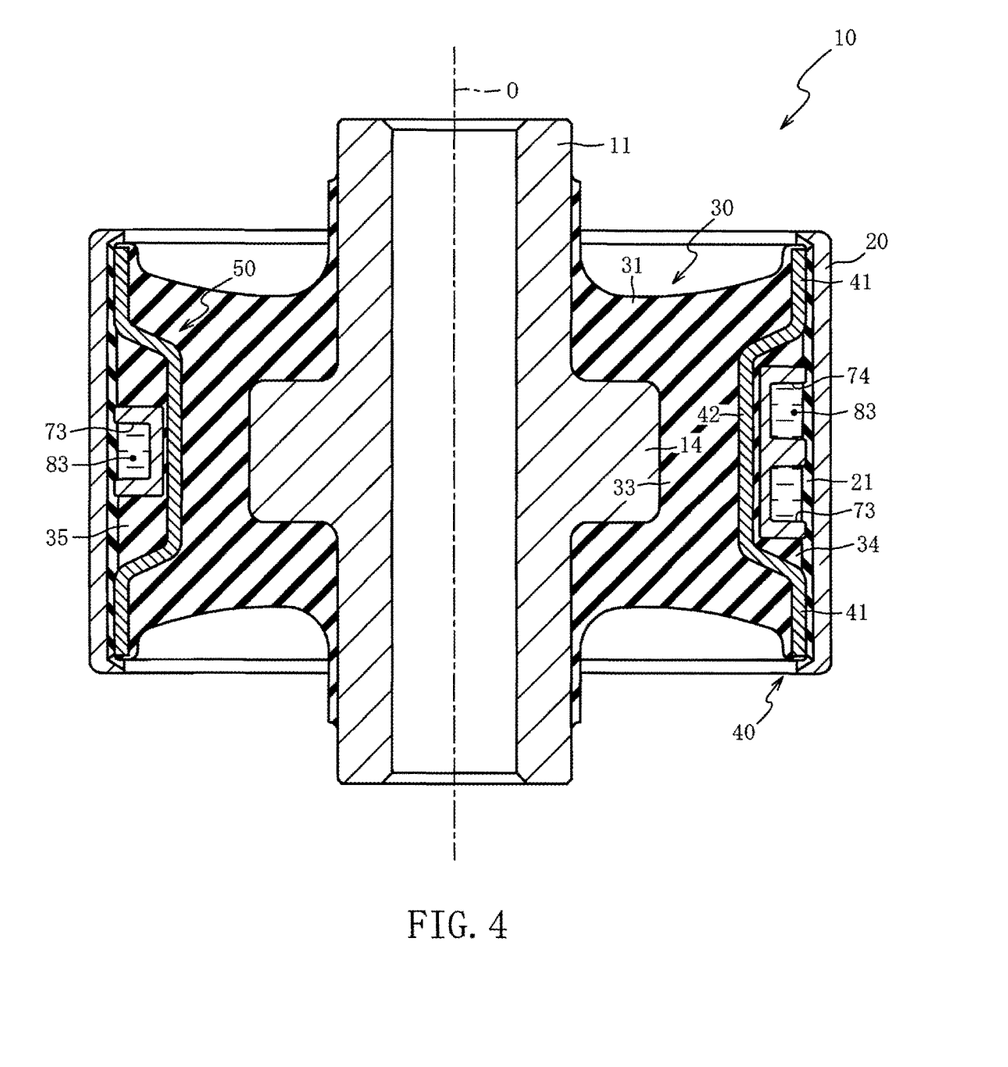
FIG. 4 is a sectional view of the liquid-sealed antivibration device taken along the IV-IV line in FIG. 1.
Figure 5:
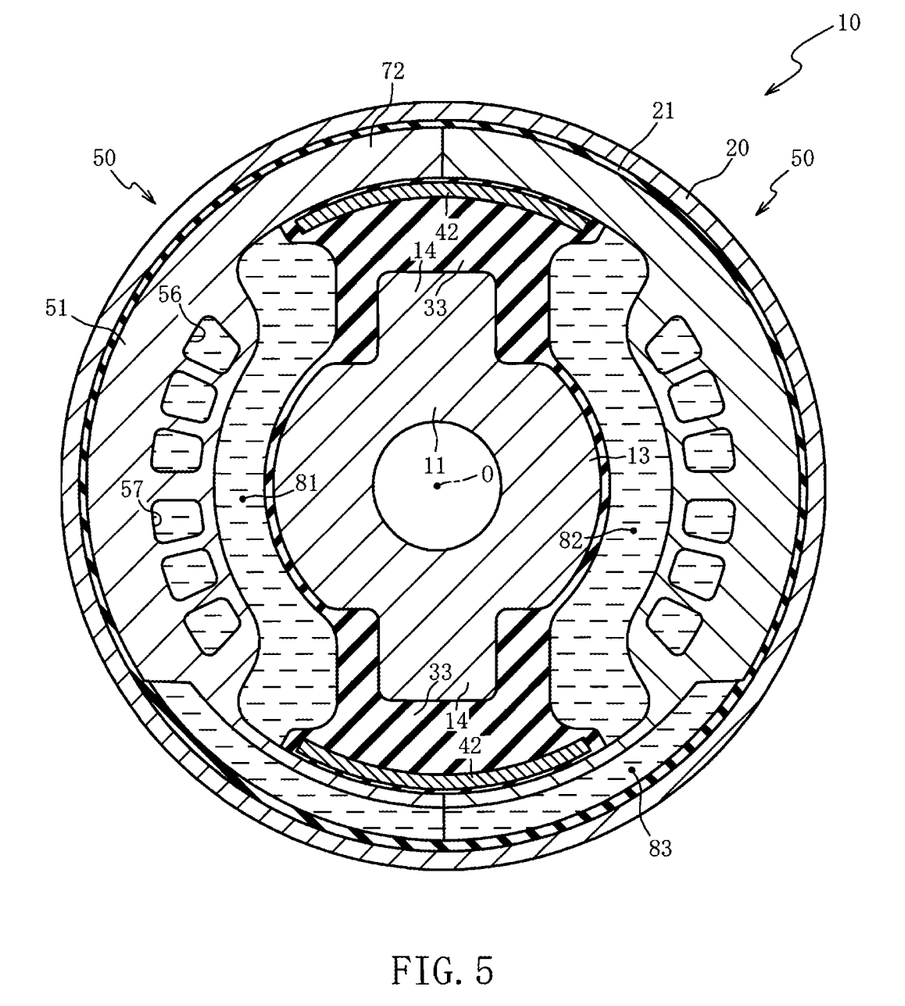
FIG. 5 is a sectional view of the liquid-sealed antivibration device taken along the V-V line in FIG. 2.

FIG. 3 is a sectional view of the liquid-sealed antivibration device 10 taken along the III-III line in FIG. 1, FIG. 4 is a sectional view of the liquid-sealed antivibration device 10 taken along the IV-IV line in FIG. 1, and FIG. 5 is a sectional view of the liquid-sealed antivibration device 10 taken along the V-V line in FIG. 2.

As shown in FIG. 3, the shaft member 11 is equipped with first portions 13 and second portions 14 (refer to FIG. 4) which protrude radially outward from a center portion in the axial direction. The sleeve member 20 is a cylindrical member made of metal and being larger in diameter than the shaft member 11. The sleeve member 20 has its inner peripheral surface to which a rubber membrane 21 constituted by a rubber-like elastic body is adhered by vulcanization, and the rubber membrane 21 holds an intermediate sleeve 40 inside. The sleeve member 20 is secured to the intermediate sleeve 40 by caulking with edges 22 being bent inside.

The antivibration base body 30 is a rubber-like elastic body elastically supporting the sleeve member 20 onto the shaft member 11. The antivibration base body 30 is joined by vulcanization to the shaft member 11 and the intermediate sleeve 40. The antivibration base body 30 includes a pair of radial partition walls 31 formed annularly on opposite sides in the axial direction of the shaft member 11 and axial partition walls 33 (refer to FIG. 4) formed to be plate-like in the axial direction of the shaft member 11. The antivibration base body 30 includes rubber membrane portions 32 joined to the radial partition walls 31 and joined by vulcanization to the first portions 13.

Outer peripheries of the radial partition walls 31 are joined by vulcanization to peripheral walls 41 of the intermediate sleeve 40. Since the pair of radial partition walls 31 closes end portions in the axial direction of the sleeve member 20, a first liquid chamber 81 and a second liquid chamber 82 are defined. Antifreezing liquid (liquid) such as ethylene glycol or the like is sealed into the first liquid chamber 81 and the second liquid chamber 82.

As shown in FIG. 4, the intermediate sleeve 40 includes the paired, ring-like peripheral walls 41 with the sleeve member 20 attached thereto and coupling walls 42 coupling the peripheral walls 41 with each other and disposed radially inside relative to the peripheral walls 41. The coupling walls 42 are each formed to take an arc shape in a cross section perpendicular to the axis O. The pair of axial partition walls 33 formed integrally with the radial partition walls 31 are joined by vulcanization to the second portions 14 of the shaft member 11 and inner peripheral surfaces of the coupling walls 42. The coupling walls 42 have outer peripheral surfaces to which wall surface portions 34, 35 formed integrally with the axial partition walls 33 are joined by vulcanization.

As shown in FIG. 5, the first liquid chamber 81 and the second liquid chamber 82 are circumferentially divided by the axial partition walls 33. As shown in FIG. 3 and FIG. 5, a pair of orifice forming members 50 are arranged between the shaft member 11 and the sleeve member 20. The orifice forming members 50 are members for forming an orifice 83 (refer to FIG. 5) which enables the first liquid chamber 81 and the second liquid chamber 82 to communicate with each other.

Figure 6:
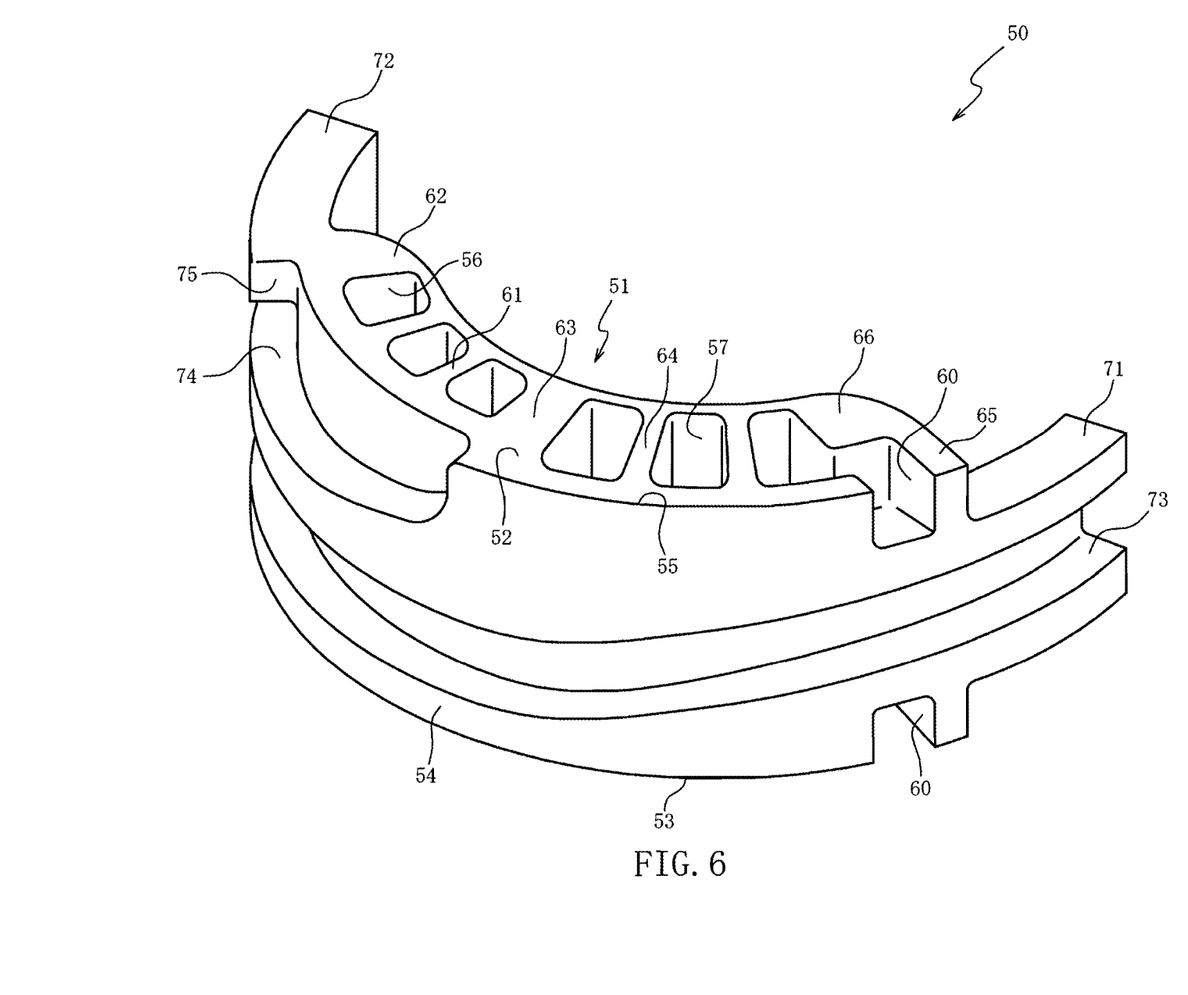
FIG. 6 is a perspective view of an orifice forming member.
Figure 7:
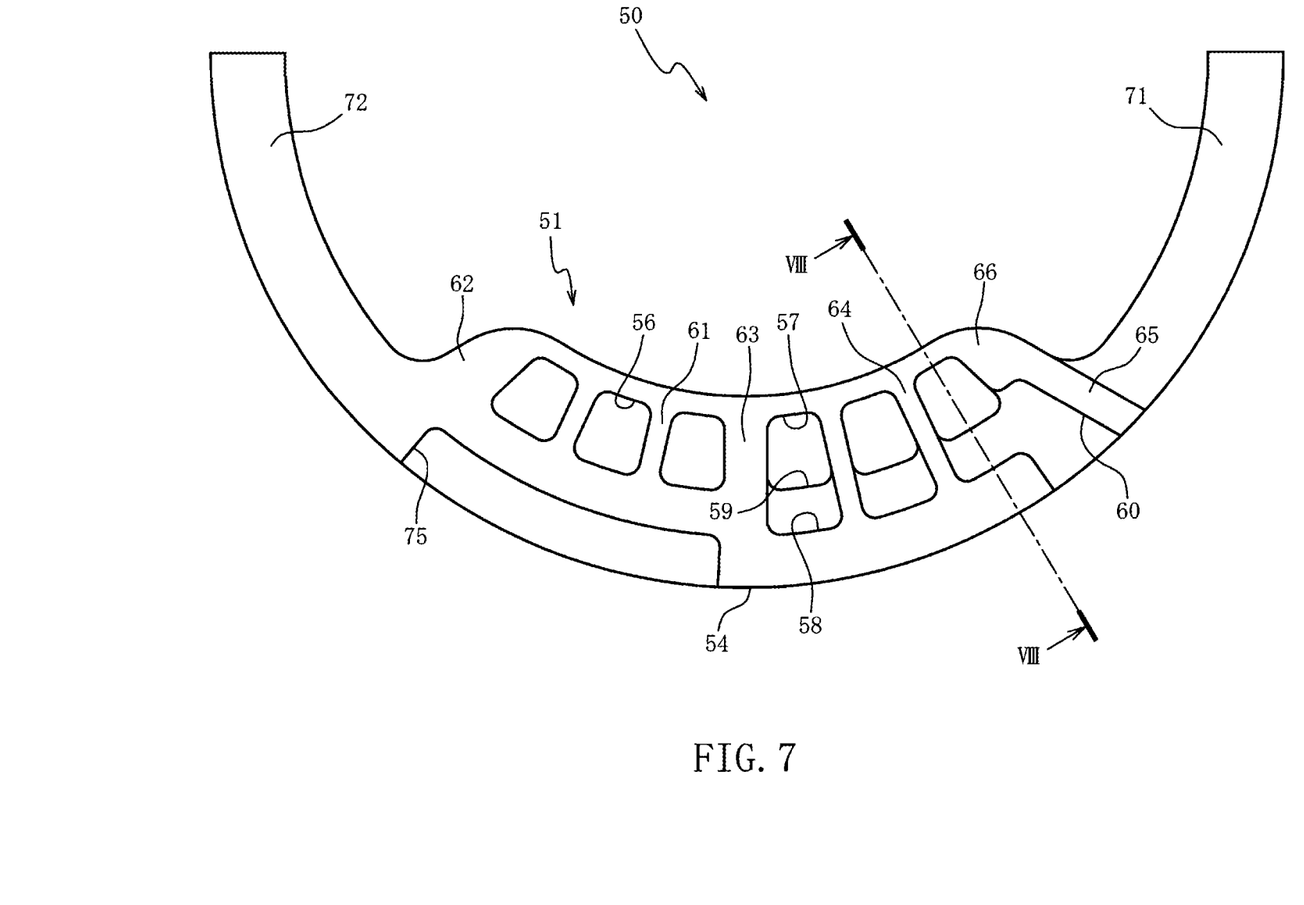
FIG. 7 is a plan view of the orifice forming member.
Figure 8:
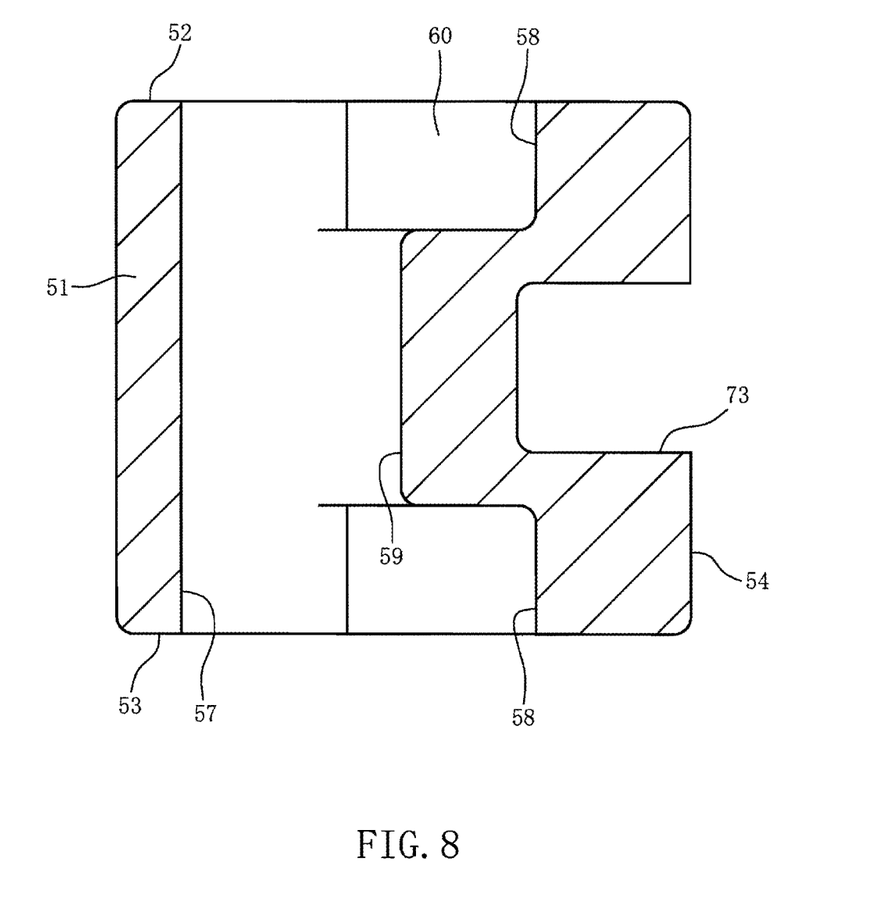
FIG. 8 is a sectional view of the orifice forming member taken along the VIII-VIII line in FIG. 7.

FIG. 6 is a perspective view of the orifice forming member 50, FIG. 7 is a plan view of the orifice forming member 50, and FIG. 8 is a sectional view of the orifice forming member 50 taken along the VIII-VIII line in FIG. 7.

As shown in FIG. 6, the orifice forming member 50 includes a stopper portion 51 formed to an arc shape in section and a first protrusion 71 and a second protrusion 72 respectively protruding from opposite sides in a circumferential direction of the stopper portion 51. The first protrusion 71 circumferentially extends from a center in the axial direction of the stopper portion 51. The orifice forming member 50 is an integrally molded article constituted by the stopper portion 51, the first protrusion 71 and the second protrusion 72. The orifice forming member 50 is made of a synthetic resin and is manufactured by injection molding. The length in the circumferential direction of the orifice forming member 50 is a length being almost half of the inner peripheral length of the sleeve member 20.

The stopper portion 51 is a massive region disposed to be opposite to the first portion 13 of the shaft member 11 in order to restrain the relative displacement of the shaft member 11 to the sleeve member 20 (refer to FIG. 5). The stopper portion 51 includes end surfaces 52, 53 in the axial direction (vertical direction in FIG. 6), an outer peripheral surface 54 connected to the end surfaces 52, 53 and curved in a convex shape, and arc-shape corner portions 55 made by the outer peripheral surface 54 and the end surfaces 52, 53. The outer peripheral surface 54 of the stopper portion 51 continues to outer peripheral surfaces of the first protrusion 71 and the second protrusion 72. The thickness in a radial direction of the stopper portion 51 is thicker than the thicknesses of the first protrusion 71 and the second protrusion 72. The axial length (the distance between the end surfaces 52, 53) of the stopper portion 51 is longer than the axial length of the first protrusion 71 and is the same as the axial length of the second protrusion 72.

As shown in FIG. 6, the stopper portion 51 is formed with a plurality (each three in the present embodiment) of hole portions 56, 57 which pierces in the axial direction (vertical direction in FIG. 6) to open on the end surfaces 52, 53 and which are juxtaposed in the circumferential direction. The hole portions 56 are disposed at the stopper portion 51 on the second protrusion 72 side, while the hole portions 57 are disposed at the stopper portion 51 on the first protrusion 71 side. Since the plurality of hole portions 56 is formed, the stopper portion 51 is formed with first remaining portions 61 between the hole portions 56 and is formed with a second remaining portion 62 at a verge on the second protrusion 72 side. The second remaining portion 62 is thicker in thickness than the first remaining portions 61. Since the plurality of hole portions 57 is formed, the stopper portion 51 is formed with fourth remaining portions 64 between the hole portions 57 and is formed with a third remaining portion 63 between the hole portions 56 and the hole portions 57. The third remaining portion 63 is thicker in thickness than the fourth remaining portions 64.

As shown in FIG. 7, the hole portions 56 each have a cross section which is almost identical from the end surface 52 to the end surface 53 throughout the axial direction (the normal direction to the drawing sheet of FIG. 7). As shown in FIG. 8, the hole portions 57 each includes large-diameter portions 58 connecting with the end surfaces 52, 53 and a small-diameter portion 59 connecting with the insides in the axial direction of the large-diameter portions 58. The cross section of the large-diameter portions 58 is larger than the cross section of the small-diameter portion 59, and the large-diameter portions 58 extend radially outward (toward the outer peripheral surface 54 side) relative to the small-diameter portion 59. The sum of depths in the axial direction (vertical direction in FIG. 6) of the large-diameter portions 58 is smaller than the difference between the axial length of the stopper portion 51 and the axial length of the first protrusion 71. Incidentally, the inside diameter of the small-diameter portions 59 is almost equal to the inside diameter of the hole portions 56.

Of the plurality of hole portions 57, the hole portion 57 closest to the first protrusion 71 communicates with recesses 60. The recesses 60 are pits formed at the corner portions 55. The recesses 60 communicate with the large-diameter portions 58 of the hole portion 57 from the first protrusion 71 side. The sum of depths in the axial direction (vertical direction in FIG. 6) of the recesses 60 is approximately equal to the difference between the axial length of the stopper portion 51 and the axial length of the first protrusion 71. Since the recesses 60 communicate with the large-diameter portions 58 of the hole portion 57 from the first protrusion 71 side, fifth remaining portions 65 and sixth remaining portions 66 being thicker than the fifth remaining portions 65 are formed at the verge on the first protrusion 71 side of the stopper portion 51. Since the fifth remaining portions 65 are provided radially outside (on the outer peripheral surface 54 side) of the sixth remaining portions 66, the fifth remaining portions 65 can be connected to the first protrusion 71. Accordingly, it is possible to secure the strength of the fifth remaining portions 65 being thinner in thickness than the sixth remaining portions 66.

Description will be made with reference back to FIG. 6. The orifice forming member 50 is formed with a groove portion 73 on the outer peripheral surfaces of the first protrusion 71, the stopper portion 51 and the second protrusion 72. The groove portion 73 curves in the axial direction while extending in the circumferential direction. The orifice forming member 50 is formed with a groove portion 74 being juxtaposed in the axial direction (vertical direction in FIG. 6) with the groove portion 73. The groove portion 74 is formed on a portion of the outer peripheral surface 54 of the second protrusion 72 and the stopper portion 51 and curves in the axial direction while extending in the circumferential direction. The groove portion 74 is connected with the end surface 52 through a notch portion 75 which is made by notching the corner portion 55 of the end surface 52. The groove portions 73, 74 are not connected with the hole portions 56, 57 and the recesses 60.

In the liquid-sealed antivibration device 10, the pair of orifice forming members 50, 50 are butted against each other at the first protrusions 71 and against each other at the second protrusions 72 with the first protrusions 71 and the second protrusions 72 disposed between the coupling walls 42 and the sleeve member 20 (refer to FIG. 5). The sleeve member 20 (rubber membrane 21) is closely adhered to the outer peripheral surfaces 54 of the orifice forming members 50, the peripheral walls 41, and thus, the orifice 83 enabling the first liquid chamber 81 and the second liquid chamber 82 to communicate with each other is defined inside the sleeve member 20 by the groove portions 73, 74 and the notch portions 75.

In the liquid-sealed antivibration device 10, when a load in a direction crossing the axis O is inputted in a direction crossing the direction (vertical direction in FIG. 5) in which the axial partition walls 33 extend radially, the axial partition walls 33 are elastically deformed to cause the displacement of the shaft member 11 relative to the sleeve member 20. Since the axial partition walls 33 partitioning the first liquid chamber 81 and the second liquid chamber 82 are elastically deformed, variations are generated in liquid pressures in the first liquid chamber 81 and the second liquid chamber 82, and thus, the liquids in the first liquid chamber 81 and the second liquid chamber 82 flow through the orifice 83. The orifice 83 causes liquid resonance to occur and thus, vibrations are damped.

Figure 9:
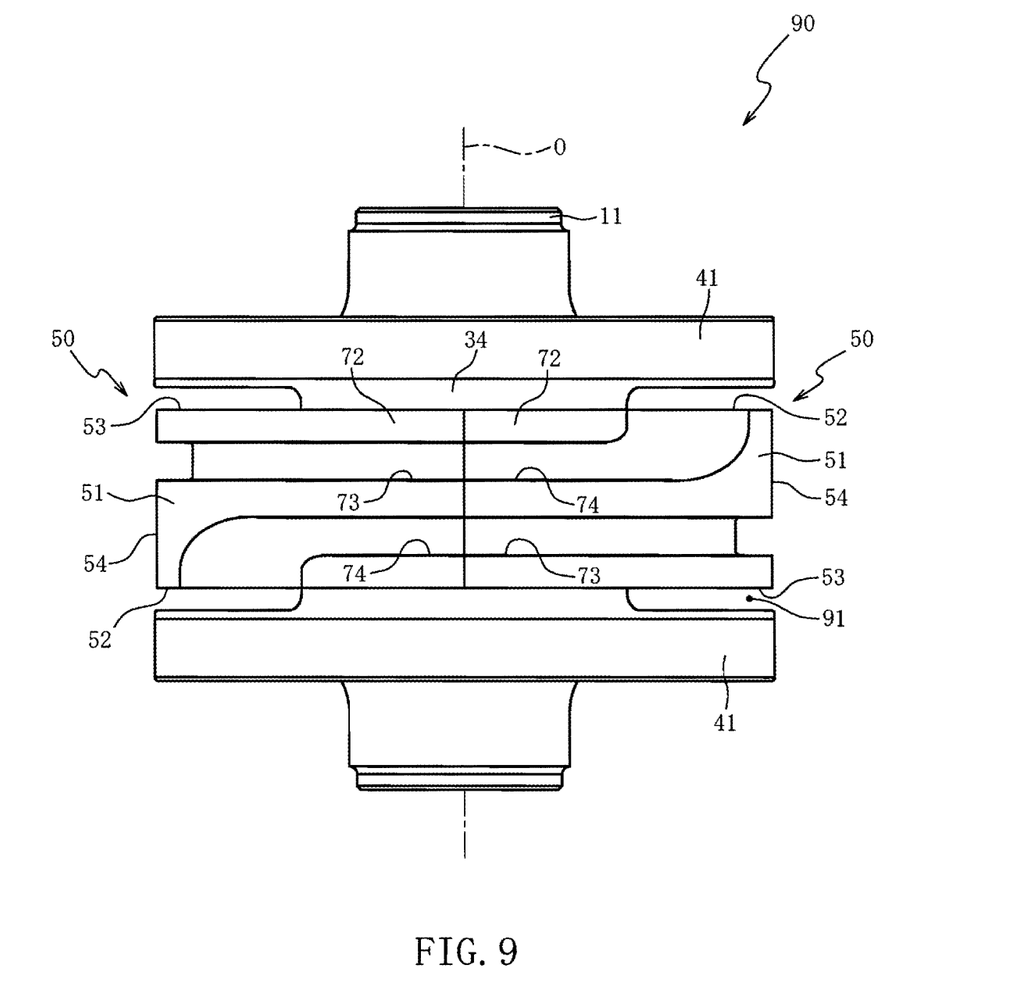
FIG. 9 is a front view of a compact body with the orifice forming member assembled.
Figure 10:
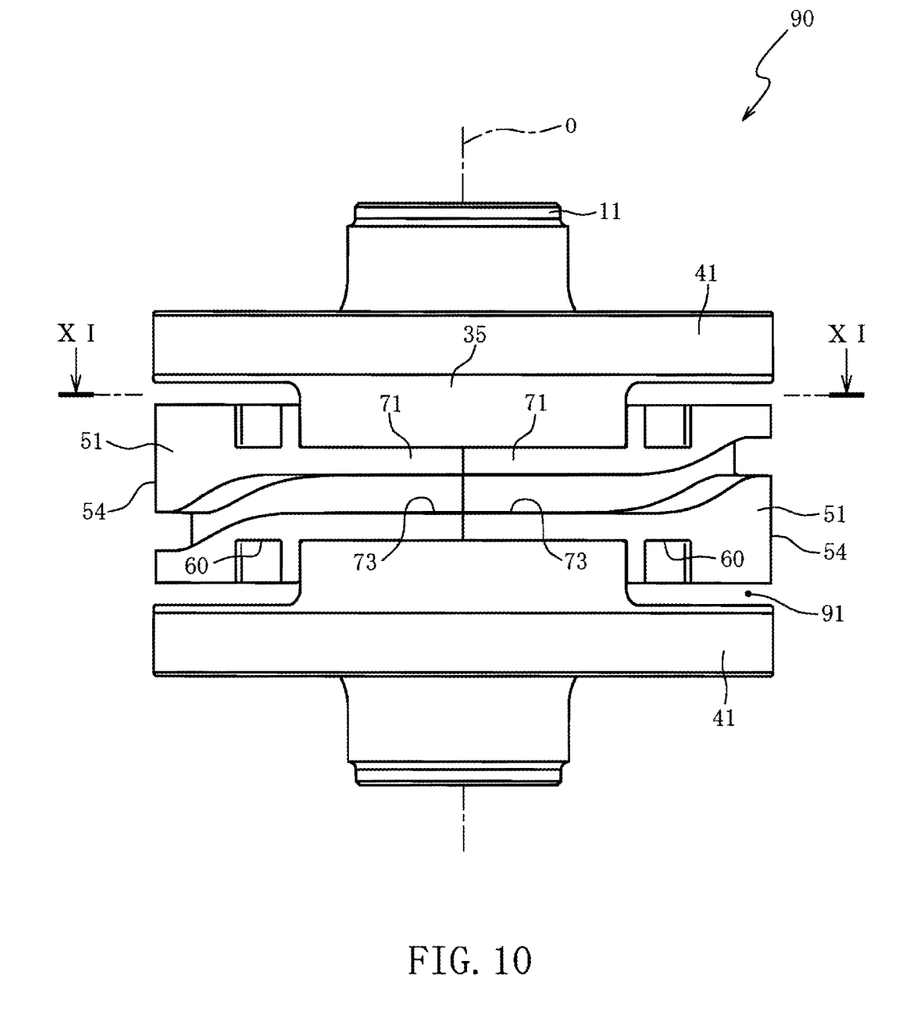
FIG. 10 is a rear view of the compact body with the orifice forming member assembled.
Figure 11:
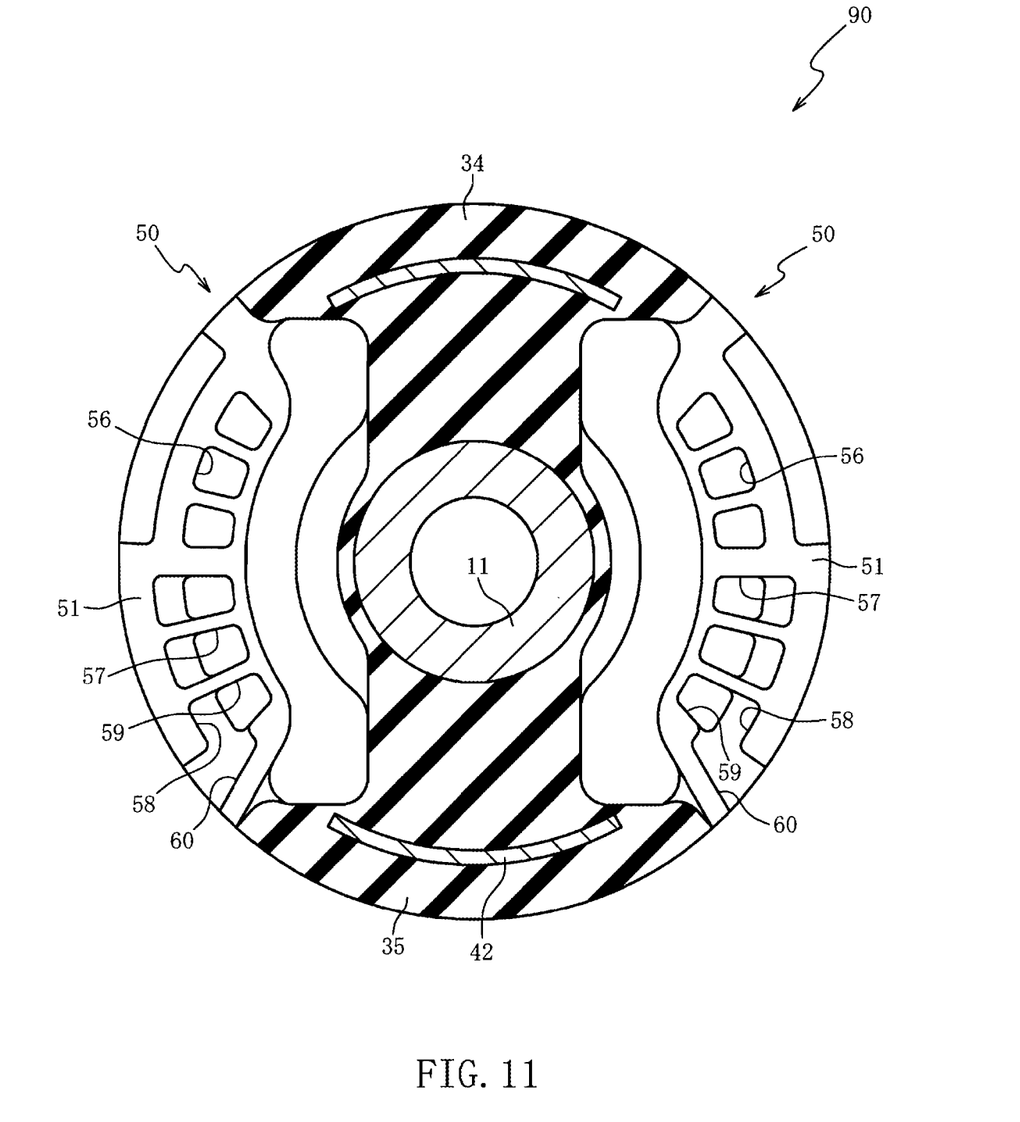
FIG. 11 is a sectional view of the compact body taken along the XI-XI line in FIG. 10.

With reference to FIG. 9 through FIG. 11, description will be made regarding a manufacturing method for the liquid-sealed antivibration device 10. FIG. 9 is a front view of a compact body 90 with the orifice forming members 50 assembled, FIG. 10 is a rear view of the compact body 90 with the orifice forming members 50 assembled, and FIG. 11 is a sectional view of the compact body 90 taken along the XI-XI line in FIG. 10.

The manufacturing method for the compact body 90 is as follows. First of all, the shaft member 11 and the intermediate sleeve 40 are set in a lower die of a vulcanization mold (not shown), and then, an upper die is clamped on the lower die. Thus, a cavity is formed for vulcanizing and forming the rubber-like elastic body. Then, the rubber-like elastic body is injected from an injection hole to fill the cavity with the rubber-like elastic body. The vulcanization mold is kept for a predetermine time in a pressurized and heated state. Thus, the rubber-like elastic body (antivibration base body 30) is vulcanized and formed, and this makes it possible to obtain the compact body 90 in which the antivibration base body 30 is vulcanized and joined to the shaft member 11 and the intermediate sleeve 40. The compact body 90 so obtained is subjected to a diameter-contraction processing at the intermediate sleeve 40, and hence, the antivibration base body 30 is given precompression.

Subsequently, as shown in FIG. 9, the second protrusions 72 of the orifice forming members 50 are fitted on the wall portion 34 with the second protrusions 72 butted against each other, and as shown in FIG. 10, the first protrusions 71 of the orifice forming members 50 are fitted on the wall surface portion 35 with the first protrusions 71 butted against each other. Gaps 91 are formed between the end surfaces 52, 53 of the stopper portions 51 and the radial partition walls 31 of the antivibration base body 30.

Subsequently, the compact body 90 with the orifice forming members 50 assembled is immersed into liquid, and thereafter, the sleeve member 20 (refer to FIG. 3) is fitted outside of the orifice forming members 50. The sleeve member 20 is contracted in diameter, and then, the edges 22 are bent inside to secure by caulking the sleeve member 20 to the intermediate sleeve 40. As a result, the liquid-sealed antivibration device 10 is obtained with the liquid sealed in the first liquid chamber 81 and the second liquid chamber 82.

At this stage, when the compact body 90 with the orifice forming members 50 assembled is immersed into liquid in the state that the shaft member 11 is held upright as shown in FIG. 11, the liquid enters the hole portions 57 from the recesses 60. Likewise, the liquid also enters other hole portions 56, 57. Since the hole portions 56, 57 pierce along the axis O of the shaft member 11 to open on the end surface 52, 53 (refer to FIG. 9), the flow of liquid between the upper and lower gaps 91 can be improved. As a consequence, since bubbles can be made to be difficult to remain in the gaps 91 between the end surfaces 52, 53 of the orifice forming members 50 and the radial partition walls 31 of the antivibration base body 30, it is possible to lessen the manipulation of waving and shaking the orifice forming members 50 (the compact body 90) in the liquid. Therefore, the manipulation can be made to be simple and easy at the time of sealing the liquid into the liquid-sealed antivibration device 10.

The hole portions 56, 57 are formed at plural places (six places in the present embodiment) of each orifice forming member 50, and the number of the recesses 60 coming out on the outer peripheral surface 54 is fewer than the number of the hole portions 56, 57 (one place in the present embodiment). Therefore, the area of the outer peripheral surface 54 of the orifice forming member 50 can be prevented from becoming small more than necessary. Since it is possible to secure the area on the outer peripheral surface 54 of the orifice forming member 50 which receives the load imposed on the sleeve member 20 when the same is subjected to the diameter-contraction processing, the orifice forming member 50 can be difficult to be damaged.

The hole portion 57 is connected with the end surfaces 52, 53 at the large-diameter portions 58, and the large-diameter portions 58 are connected at the insides in the axial direction with the small-diameter portion 59 being smaller in cross section than the large-diameter portions 58. Since the large-diameter portions 58 being larger in cross section than the small-diameter portion 59 are connected with the end surfaces 52, 53, the liquid can be eased to enter the hole portion 57 from the large-diameter portions 58 when the same are immersed in the liquid. Further, since the cross section of the orifice forming member 50 (the stopper portion 51) can be secured thanks to the small-diameter portion 59 being smaller in cross section than the large-diameter portions 58, the strength of the stopper portion 51 can be secured.

Since the hole portions 56, 57 pierce through the stopper portion 51 being larger in radial thickness than the first protrusion 71 and the second protrusion 72, it is possible to make the thickness of the stopper portion 51 (the portion excepting the hole portions 56, 57) come close to the thickness of the first protrusions 71 and the second protrusions 72. As a result, it is possible to restrain depression deformation (so called sink marks) from being produced on the surface of the stopper portion 51 due to ununiformity in contraction at the time of a cooling in injection molding. Therefore, it is possible to secure the dimensional accuracy of the orifice forming member 50.

At the hole portions 57, the large-diameter portions 58 extend radially outward (toward the outer peripheral surface 54 side) beyond the small-diameter portions 59. Thus, when the compact body 90 with the orifice forming members 50 attached is immersed into the liquid, it is possible to make the liquid easily enter the hole portions 57 from the large-diameter portions 58 on the outer peripheral surface 54 side. Therefore, it becomes possible to make bubbles difficult to remain in the gaps 91.

The sum of depths in the axial direction (vertical direction in FIG. 9) of the large-diameter portions 58 is smaller than the difference between the axial length of the stopper portion 51 and the axial length of the first protrusion 71, and the sum of depths in the axial direction of the recesses 60 is almost equal to the difference between the axial length of the stopper portion 51 and the axial length of the first protrusion 71. This enables the width of the groove portion 73 not to be influenced by the large-diameter portions 58 and the recesses 60. Further, since the inside diameter of the small-diameter portions 59 is almost equal to the inside diameter of the hole portions 56, the depths of the groove portions 73, 74 are enabled not to be influenced by the hole portions 56 and the small-diameter portions 59.

The cross section of the orifice 83 determined by the depths and the widths of the groove portions 73, 74 is a factor that influences the damping characteristic of the liquid-sealed antivibration device 10 depending on the orifice 83. However, since the hole portions 56, 57 and the recesses 60 do not influence the cross section of the orifice 83, it is possible to make bubbles difficult to remain in the first liquid chamber 81 and the second liquid chamber 82 with the damping characteristic of the liquid-sealed antivibration device 10 secured.

The second remaining portion 62 and the sixth remaining portion 66 at the opposite ends in the circumferential direction of the stopper portion 51 are thicker than the first remaining portions 61 between the hole portions 56 and the fourth remaining portions 64 between the hole portions 57.

Thus, the second remaining portion 62 and the sixth remaining portion 66 can be made not to be damaged when the relative displacement between the shaft member 11 and the sleeve member 20 causes the first portion 13 (rubber membrane portion 32) of the shaft member 11 to collide against the opposite ends in the circumferential direction of the stopper portions 51. Further, since the third remaining portion 63 at the center in the circumferential direction of the stopper portion 51 is thicker than the first remaining portion 61 between the hole portions 56 and the fourth remaining portion 64 between the hole portions 57, and thus, the stopper portion 51 can be made not to buckle when the relative displacement between the shaft member 11 and the sleeve member 20 causes the first portion 13 (rubber membrane portion 32) of the shaft member 11 to collide against the stopper portion 51.

Since the recesses 60 are connected with the large-diameter portion 58 of the hole portion 57 from the first protrusion 71 side, it is possible to define the fifth remaining portions 65 being thinner than the thickness of the sixth remaining portions 66. Since the fifth remaining portions 65 can be made to be thin, sink marks (depression deformation on the surface) can be made to be difficult to be produced at the fifth remaining portions 65 and the sixth remaining portions 66.

Further, since the recesses 60 are connected with the large-diameter portions 58 of the hole portion 57 from the first protrusion 71 side, the areas of the recesses 60 on the end surfaces 52, 53 (the dimension of the recess 60 as viewed in the axial direction) can be enlarged in comparison with the case where the recesses are provided outside in the radial direction of the large-diameter portions 58. As a result, the advance of liquid into the recesses 60 can become easy when the compact body 90 with the orifice forming members 50 assembled is immersed into the liquid. Therefore, when the orifice forming members 50 and the compact body 90 are immersed into the liquid, the flow of the liquid between the gaps 91 being on upper and lower sides can be made to be improved in comparison with the case where the recesses are provided outside the large-diameter portions 58 in the radial direction.

Hereinabove, the present invention has been described based on the embodiment. However, the present invention is not in any way limited to the foregoing embodiment, and it can easily be inferred that various modifications are possible without departing from the gist of the present invention. For example, the number, dimension, arrangement and the like of the hole portions 56, 57 and the recesses 60 can be set suitably.

In the foregoing embodiment, the shaft member 11 has been described as that having the first portions 13 integrally provided on the outer periphery and covered with the rubber membrane portions 32. However, this does not necessarily limit the shaft member 11 to one descried. For example, it is possible as a matter of course to omit the first portions 13 and the rubber membrane portions 32. In this case, the omissions of the first portions 13 and the rubber membrane portions 32 result in elongating the distance between the stopper portions 51 of the orifice forming members 50 and the shaft member 11 by that corresponding to the omission. Thus, the thicknesses in the radial direction of the stopper portions 51 are increased, whereby the shaft member 11 is made to interfere with the stopper portions 51 when a large load is inputted. Since this enables the displacement of the antivibration base body 30 to be restricted, the durability can be secured. In this case, it is possible as a matter of course to provide a rubber membrane for impact damping on the outer periphery of the shaft member 11 and the inner peripheral surface of each of the stopper portions 51.

Further, in the foregoing embodiment, description has been made regarding the example wherein the first portions 13 are integrally formed on the outer periphery of the shaft member 11. However, this does not necessarily limit the first portions 13 to the example. It is possible as a matter of course to provide the shaft member 11 with the first portions 13 by winding or adhering separate members made of a synthetic resin, rubber or the like around the outer periphery of the shaft member 11.

In the foregoing embodiment, description has been made regarding the liquid-sealed antivibration device 10 in which a load is inputted in a direction perpendicular to the axis O. For this reason, the stopper portions 51 of the orifice forming members 50 are disposed in a direction perpendicular to the shaft member 11. That is, the first portions 13 and the stopper portions 51 are arranged to become a line symmetry taking the axis O as a symmetry axis. However, this does not necessarily limit the liquid-sealed antivibration device to one descried. The positions of the first portions 13 and the stopper portions 51 can suitably be set in dependence on the input direction of the load. For example, where the input direction of the load is a direction which obliquely intersects the axial direction (the direction of the axis O), the first portions 13 and the stopper portions 51 may be set to become a line symmetry wherein a straight line obliquely intersecting the axis O is taken as a symmetry line.

In the foregoing embodiment, description has been made regarding the example wherein the pair of orifice forming members 50 are butted against each other to form the orifice 83 having the length of about one round and half inside the sleeve member 20. However, the present invention is not limited to the example. The length of the orifice 83 may suitably be set in dependence on a specification as required.

In the foregoing embodiment, description has been made regarding the example wherein the pair of orifice forming members 50 are butted against each other to form the orifice 83 enabling the first liquid chamber 81 and the second liquid chamber 82 to communicate with each other. However, the present invention is not limited to the example. It is possible as a matter of course to form by a single orifice forming member 50 the orifice enabling two liquid chambers (main liquid chamber and secondary liquid chamber) to communicate with each other.

Further, in a liquid-sealed antivibration device of the kind wherein an antivibration base member partitions a main liquid chamber and a secondary liquid chamber, it is possible as a matter of course to apply the technology in the foregoing embodiment to a liquid-sealed antivibration device wherein a plurality of independent main liquid chambers is provided by a partition wall partitioning the main liquid chamber in the axial direction. In this case, the orifice forming member is disposed in each of the main liquid chambers juxtaposed in the axial direction, and the orifice forming member forms an orifice enabling each main liquid chamber and each secondary liquid chamber to communicate with each other.

Like the liquid-sealed antivibration device having been described in the foregoing embodiment, the liquid-sealed antivibration device in each of these modifications is also manufactured by obtaining the compact body 90 with the antivibration base body 30 vulcanized and joined to the shaft member 11 and the intermediate sleeve 40, then by immersing into the liquid the compact body 90 with the orifice forming member assembled, and by subjecting the sleeve member 20 covered outside to a diameter-contraction process. Also in this case, since the orifice forming member is formed with the hole portions and the recesses, it is possible to realize the same operation and effects as those described in the foregoing embodiment.

The invention claimed is:

1. A liquid-sealed antivibration device comprising:
a shaft member formed cylindrically;
a sleeve member disposed with a space relative to the shaft member;
an antivibration base body constituted by a rubber-like elastic body which elastically supports the sleeve member relative to the shaft member and which defines a first liquid chamber and a second liquid chamber between the shaft member and the sleeve member; and
an orifice forming member made of a synthetic resin and disposed inside the sleeve member, wherein
the orifice forming member is formed with end surfaces on which hole portions piercing along the axis of the shaft member open, and an outer peripheral surface adhered closely to the sleeve member to form a groove portion becoming an orifice, the orifice making the first liquid chamber communicate with the second liquid chamber, and
recesses formed at corner portions defined by the end surfaces and the outer peripheral surface are connected to at least one of the hole portions.

2. The liquid-sealed antivibration device according to claim 1, wherein
the hole portions are formed at a plurality of places of the orifice forming member, and
the number of the recesses is fewer than the number of the hole portions.

3. The liquid-sealed antivibration device according to claim 1, wherein the hole portions includes:
large-diameter portions connected to the end surfaces; and
a small-diameter portion connected to insides in an axial direction of the large-diameter portions and being smaller in cross section than the large-diameter portions.

4. A liquid-sealed antivibration device comprising:
a shaft member formed cylindrically;
a sleeve member disposed with a space relative to the shaft member;
an antivibration base body constituted by a rubber-like elastic body which elastically supports the sleeve member relative to the shaft member and which defines a first liquid chamber and a second liquid chamber between the shaft member and the sleeve member; and
an orifice forming member made of a synthetic resin and disposed inside the sleeve member, wherein
the orifice forming member is formed with end surfaces on which a hole portion piercing along the axis of the shaft member opens, and an outer peripheral surface adhered closely to the sleeve member to form a groove portion becoming an orifice, the orifice making the first liquid chamber communicate with the second liquid chamber, and
recesses formed at corner portions defined by the end surfaces and the outer peripheral surface are connected to the hole portion,
wherein the orifice forming member comprises:
a stopper portion formed with the hole portion and the recesses; and
a first protrusion and a second protrusion respectively protruding from opposite sides in a circumferential direction of the stopper portion and having outer peripheral surfaces continuing to the outer peripheral surface of the stopper portion,
wherein the groove portion is formed on the stopper portion, the first protrusion and the second protrusion,
the lengths in an axial direction of the stopper portion and the second protrusion are longer than the axial length of the first protrusion, and
the recesses are formed at the stopper portion on the first protrusion side.

5. A liquid-sealed antivibration device comprising:
a shaft member formed cylindrically;
a sleeve member disposed with a space relative to the shaft member;
an antivibration base body constituted by a rubber-like elastic body which elastically supports the sleeve member relative to the shaft member and which defines a first liquid chamber and a second liquid chamber between the shaft member and the sleeve member; and
an orifice forming member made of a synthetic resin and disposed inside the sleeve member, wherein
the orifice forming member is formed with end surfaces on which a hole portion piercing along the axis of the shaft member opens, and an outer peripheral surface adhered closely to the sleeve member to form a groove portion becoming an orifice, the orifice making the first liquid chamber communicate with the second liquid chamber, and
recesses formed at corner portions defined by the end surfaces and the outer peripheral surface are connected to the hole portion,
wherein the orifice forming member comprises:
a stopper portion formed with the hole portion and the recesses; and
a first protrusion and a second protrusion protruding from opposite sides in a circumferential direction of the stopper portion and having outer peripheral surfaces continuing to the outer peripheral surface of the stopper portion,
wherein the groove portion is formed on the stopper portion, the first protrusion and the second protrusion,
the axial lengths of the stopper portion and the second protrusion are longer than the axial length of the first protrusion, and
the large-diameter portions are formed at the stopper portion on the first protrusion side.

* * * * *